United States Patent [19]

Molvig et al.

[11] Patent Number: 5,640,335

[45] Date of Patent: Jun. 17, 1997

[54] COLLISION OPERATORS IN PHYSICAL PROCESS SIMULATION

[75] Inventors: Kim Molvig, Concord; Christopher M. Teixeira, Cambridge; Kenneth R. Traub, Watertown, all of Mass.

[73] Assignee: EXA Corporation, Cambridge, Mass.

[21] Appl. No.: 409,685

[22] Filed: Mar. 23, 1995

[51] Int. Cl.$^6$ .............................. G06F 17/10; G06F 19/00
[52] U.S. Cl. ......................... 364/578; 364/509; 364/223; 364/924; 340/825.74
[58] Field of Search ................................... 364/578, 509, 364/223, 224.7, 232.21, 223.4, 924, 924.3, 924.4, 931, 931.01, 806, 803; 395/119, 124, 127; 340/825.79

[56] References Cited

U.S. PATENT DOCUMENTS

| | | | |
|---|---|---|---|
| 4,498,134 | 2/1985 | Hansen et al. | 364/200 |
| 4,507,726 | 3/1985 | Grinberg et al. | 364/290 |
| 4,809,202 | 2/1989 | Wolfram | 364/578 |
| 4,831,519 | 5/1989 | Morton | 364/200 |
| 4,860,245 | 8/1989 | Kinoshita | 364/900 |
| 4,933,895 | 6/1990 | Grinberg et al. | 364/748 |
| 4,969,116 | 11/1990 | Wada et al. | 364/578 |
| 4,987,554 | 1/1991 | Kaufman | 364/522 |
| 4,989,166 | 1/1991 | Akasaka et al. | 364/578 |
| 5,159,690 | 10/1992 | Margolus | 395/800 |
| 5,255,212 | 10/1993 | Kondoh et al. | 364/578 |
| 5,377,129 | 12/1994 | Molvig et al. | 364/578 |
| 5,408,638 | 4/1995 | Sagawa et al. | 395/500 |
| 5,416,729 | 5/1995 | Leon et al. | 364/578 |
| 5,424,963 | 6/1995 | Turner et al. | 364/578 |
| 5,432,718 | 7/1995 | Molvig et al. | 364/578 |

FOREIGN PATENT DOCUMENTS 0 228 915   7/1987   European Pat. Off. .

OTHER PUBLICATIONS

Fredkin et al., "Conservative Logic," International Journal of Theoretical Physics, vol. 21, Nos. 3/4, pp. 219–253 (1982).

Frisch et al., "Lattice–Gas Automata for the Navier–Stokes Equation," Physical Review Letters, vol. 56, No. 14, pp. 1505–1508 (Apr. 1986).

Frisch et al., "Lattice Gas Hydrodynamics in Two and Three Dimensions," Complex Systems 1:649–707 (1987).

Hardy et al., "Molecular Dynamics of a Classical Lattice Gas: Transport Properties and Time Correlation Functions," Physical Review A, vol. 13, No. 5, pp. 1949–1961 (May 1976).

Hasslacher, "Discrete Fluids: Part I: Background for Lattice Gas Automata," Los Alamos Science Special Issue, pp. 175–217 (1987).

Henon, "Isometric Collision Rules for the Four–Dimensional FCHC Lattice Gas," Complex Systems 1:475–494 (1987).

(List continued on next page.)

Primary Examiner—Kevin J. Teska
Assistant Examiner—Tyrone V. Walker
Attorney, Agent, or Firm— Fish & Richardson P.C.

[57] ABSTRACT

A computer implemented method for simulating a physical process. The method includes storing in a memory a state vector for each of a number of voxels. Each state vector includes a plurality of integers, each of which corresponds to a particular momentum state of a number of possible momentum states at a voxel and represents the number of elements having the particular momentum state. Each integer has more than two possible values. The method also includes performing interaction operations that model interactions between elements of different momentum states and include interaction rules that operate on a subset of the integers of a state vector. The interaction rules comprise a collision operator that transfers between integers representing a first set of momentum states and integers representing a second set of momentum states a number of elements that is determined based on the number of elements in the first and second sets of momentum states. Finally, the method includes performing move operations on the state vectors that reflect movement of elements to new voxels.

20 Claims, 4 Drawing Sheets

OTHER PUBLICATIONS

Kadanoff, "On Two Levels," Physics Today (Sep. 1986).

Kadanoff et al., "Transport Coefficients Near the Critical Point: A Master Equation Approach," 165 Phys. Review 310 (1968).

Klein, "Negative Absolute Temperatures," Physical Review, vol. 104, No. 3, p. 589 (Nov. 1956).

Lin et al., "Plasma Simulation Using the Massively Parallel Processor," NASA CP-2478, pp. 185–191 (Jul. 1987).

Margolus et al., "Cellular-Automata Supercomputers for Fluid-Dynamics Modeling," Physical Review Letters, vol. 56, No. 16, pp. 1694–1696 (Apr. 1986).

Molvig et al., "Multi-species Lattice-Gas Automata for Realistic Fluid Dynamics," Springer Proceedings in Physics, vol. 46, pp. 206–231 (1990).

Perez et al, "OUIPPI-1, A SIMD Computer Using Integrated Parallel Processors," Proc. of Conpar Conf. Papers Plenary Sess. and Stream A Manchester, Sep. 12–16, 1988, British Comp. Soc. Parallel Proc. Spec. Group GB.

Burges et al., "Buoyant Mixtures of Cellular Automation Gases," Complex Systems, 1:31–50 (1987).

Chopard et al., "Cellular Automata Model for Heat Conduction in a Fluid," Physics Letters A, vol. 126, Nos. 8, 9, pp. 476–480 (Jan. 1988).

Clouqueur et al., "RAPI, A Cellular Automation Machine for Fluid Dynamics," Complex Systems, pp. 585–597 (1987).

d'Humieres et al., "2-D and 3-D Hydrodynamics on Lattice Gases," Fruhjahrstagung der Schweiz. Physikalischen Gesellschaft, vol. 59 (1986).

d'Humieres et al., "Lattice Gas Models for 3D Hydrodynamics," Europhys. Lett., 2(4), pp. 291–297 (1986).

d'Humieres et al., "Numerical Simulations of Hydrodynamics with Lattice Gas Automata in Two Dimensions," Complex Systems 1:599–632 (1987).

Ramsey, "Thermodynamics and Statistical Mechanics at Negative Absolute Temperatures," Physical Review, vol. 103, No. 1, pp. 20–28 (Jul. 1956).

Rivet, "Three-Dimensional Lattice Gas Hydrodynamical Simulations: First Results," C.R. Acad. Sci. Paris, t. 305, Series II, pp. 751–756 (1987).

Toffoli, "Cellular Automata as an Alternative to (Rather Than an Approximation of) Differentiation Equation in Modeling Physics," Physica 10D:117–127 (1984).

Tucker, "Cellular Automata Machine: The Ultimate Parallel Computer," High Technology, pp. 85–87 (Jun. 1984).

Vichniac, "Cellular-Automata Fluids," Instabilities and Nonequilibrium Structures II, pp. 97–116 (1989).

Vichniac, "Simulating Physics with Cellular Automata," Physica, 10D:96–110 (1984).

Wolfram, "Cellular Automation Fluids 1: Basic Theory," J. Stat. Phys., vol. 45, Nos. 3/4, pp. 471–526 (1986).

PCT International Search Report dated Jun. 14, 1996.

D'Humieres et al., "One-Dimensional Lattice Gas Models. Divergence of the Viscosity," Comptes Rendus de L'Academie des Sciences, vol. 308, Serie II, No. 7, Feb. 16, 1989, pp. 585–590.

Clavin et al., "Simulation of Free Boundaries in Flow Systems by Lattice-Gas Models," Journal of Fluid Mechanics, vol. 188, Mar. 1988, 437–464.

Fahner, "A Multispeed Model for Lattice-Gas Hydrodynamics," Complex Systems, vol. 5, No. 1, Feb. 1991, pp. 1–14.

Henon, "Viscosity of a Lattice Gas," Complex Systems, vol. 1, No. 4, 1987, pp. 763–789.

Kadanoff et al., "From Automata to Fluid Flow: Comparisons of Simulations and Theory," Physical Review A, vol. 40, No. 8, Oct. 15, 1989, pp. 4527–4541.

Lim, "Cellular-Automation Simulations of Simple Boundary-Layer Problems," Physical Review A, vol. 40, No. 2, Jul. 15, 1989, pp. 968–980.

COLLISION OPERATORS IN PHYSICAL PROCESS SIMULATION

BACKGROUND OF THE INVENTION

This invention relates to computer systems for simulating physical processes, e.g., fluid flow.

The conventional approach to simulating high Reynolds number flow has been to generate discretized solutions of the Navier-Stokes differential equations, in which high-precision floating point arithmetic operations are performed at each of many discrete spatial locations on variables representing macroscopic physical quantities (e.g., density, temperature, flow velocity). The fastest and most powerful computers available are used, and yet very limited and inexact results have been achieved. To keep run times manageable, very coarse grid resolutions are used, and even at those coarse resolutions there are unacceptable errors in the solutions due to accumulated round off errors inherent in performing successive floating point arithmetic operations.

There has long been an effort to replace the differential equation approach with what is generally known as lattice gas (or cellular) automata, in which the macroscopic-level simulation provided by solving the Navier-Stokes equations is replaced by a microscopic-level model that performs operations on particles moving between sites on a lattice. The goal has long been to find a microscopic-level model of particle interactions and movement that would produce the correct macroscopic results (i.e., variations in density, temperature, etc. as prescribed by the Navier Stokes equations).

The traditional lattice gas simulation assumes a limited number of particles at each lattice site, with the particles being represented by a short vector of bits. Each bit represents a particle moving in a particular direction. For example, one bit in the vector might represent the presence (when set to 1) or absence (when set to 0) of a particle moving along a particular direction. Such a vector might have six bits, with, for example, the values 110000 indicating two particles moving in opposite directions along the X axis, and no particles moving along the Y and Z axes. A set of collision rules governs the behavior of collisions between particles at each site (e.g., a 110000 vector might become a 001100 vector, indicating that a collision between the two particles moving along the X axis produced two particles moving away along the Y axis). The rules are implemented by supplying the state vector to a look-up table that performs a permutation on the bits (e.g., transforming the 110000 to 001100). Particles are then moved to adjoining sites (e.g., the two particles moving along the Y axis would be moved to neighboring sites to the left and right along the Y axis).

Molvig et al. taught an improved lattice gas technique in which, among other things, many more bits were added to the state vector at each lattice site (e.g., 54 bits for subsonic flow) to provide variation in particle energy and movement direction, and collision rules involving subsets of the full state vector were employed. Molvig et al. PCT/US91/04930; Molvig et al., "Removing the Discreteness Artifacts in 3D Lattice-Gas Fluids", Proceedings of the Workshop on Discrete Kinetic Theory, Lattice Gas Dynamics, and Foundations of Hydrodynamics, World Scientific Publishing Co., Pte., Ltd., Singapore (1989); Molvig et al., "Multi-species Lattice-Gas Automata for Realistic Fluid Dynamics", Springer Proceedings in Physics, Vol. 46, Cellular Automata and Modeling of Complex Physical Systems, Springer-Verlag Berlin, Heidelberg (1990) (all hereby incorporated by reference). These improvements and others taught by Molvig et al. produced the first practical lattice gas computer system. Discreteness artifacts that had made earlier lattice gas models inaccurate at modeling fluid flow were eliminated.

Chen et al. taught an improved simulation technique in "Computer System For Simulating Physical Processes", U.S. application No. 08/165,293, filed Dec. 10, 1993 (which is hereby incorporated by reference). Instead of the lattice gas model in which at each lattice site (voxel) there is at most a single particle in any momentum state (e.g., at most a single particle moving in a particular direction with a particular energy), the system used a multi-particle technique in which, at each voxel, multiple particles could exist at each of multiple states (e.g., 0–255 particles could be moving in a particular direction). The state vector, instead of being a set of bits, was a set of integers (e.g., a set of eight bit bytes providing integers in the range of 0 to 255), each of which represented the number of particles in a given state. For example, instead of being limited to a single particle moving in each direction at each momentum state, the system had the flexibility to model multiple particles moving in each direction at each momentum state.

Chen et al.'s use of integer state vectors made possible much greater flexibility in microscopic modeling of physical processes because much more variety was possible in the collision rules that operated on the new integer state vectors. For example, rules were established that collided and scattered a predetermined number of particles while allowing other particles to pass without collision. Integer state vectors also promised to provide solutions to many problems still remaining in single-particle lattice gas techniques even after the improvements taught in the Molvig et al. publications. For example, the multi-particle technique provided a way of achieving the so-called Maxwell-Boltzmann statistics that are characteristic of high Reynolds number fluid flow. The earlier Molvig et al. system achieved so-called Fermi-Dirac statistics, which only resemble Maxwell-Boltzmann statistics if the lattice sites are sparsely populated. The Chen et al. system avoided the need to use a sparsely populated lattice, and thus avoided the huge computational penalty associated therewith.

The Chen et al. system also provided a way of simulating the interaction between fluid particles and solid objects using a new "slip" technique that extended the simulation only to the outer surface of the boundary layer around the solid object, and not through it to the surface of a solid object. At the outer surface of the boundary layer, the collision rules governing interactions between particles and the surface allowed particles to retain tangential momentum. Instead of the particles being returned from the surface in the reverse tangential direction from which they arrived (as occurred with a prior "bounce back" technique), the particles were permitted to reflect from the surface and continue in the same tangential direction in which they arrived.

To simulate physical processes, the Chen et al. system employed collision rules based on a collision operator referred to as the "sandpaper" operator. According to the sandpaper rule, each collision rule was defined as operating on two pairs of momentum states and having a particular "grit", and would transfer a number of elements between a first pair of momentum states and a second pair of momentum states based on likelihood of collisions in each pair of momentum states. For example, if a particular collision rule was defined as having a grit of four and operating on states i, j, k and l, the rule would transfer four particles from each of states i and j to each of states k and l when the likelihood of collisions between elements in states i and j (as determined by the product of the number of elements in states i and j) was greater than the likelihood of collisions between elements in states k and l (as determined by the product of the number of elements in states k and l). Otherwise, the rule would transfer four particles from each of states k and l to each of states i and j.

SUMMARY OF THE INVENTION

In a first aspect, the invention features a computer system that employs a new collision operator in simulating physical processes. The new collision operator transfers elements from a first set of momentum states (i.e., a pair, trio, quartet or larger set of momentum states) to a second set of momentum states, and determines the number of elements to transfer based on the number of elements in the two sets of momentum states. This operator offers an advantage over the sandpaper rule in that, unlike the sandpaper rule, this operator allows the physical process to quickly approach equilibrium without thereafter causing the number of elements in each momentum state to fluctuate around the momentum state's equilibrium value.

The collision operator determines the number of elements to transfer using a relationship that is linearly dependent on the number of elements in the affected states (as opposed to being non-linearly dependent). Preferably, the relationship causes the number of elements to decrease as the number of elements in the affected momentum states approach equilibrium values. In addition, the relationship may dictate that the number of elements transferred approaches zero as the physical process approaches equilibrium and equals zero when the physical process reaches equilibrium.

The use of a linearly-dependent relationship provides the collision operator with statistical properties that enable the process simulation system to produce results having accuracy that is well beyond the arithmetic accuracy permitted by the eight-bit integer values that the system employs. Through proper construction of the operator, statistical accuracy is achieved that far exceeds the bit accuracy retained in the state vector for purposes of computation. For example, the system described has obtained one part per million accuracy for mean dynamics while using only eight-bit states in the state vectors (where eight-bit states provide only one part in 255 arithmetic accuracy). Thus, the use of the linearly-dependent relationship imbues the system with high computational efficiency in that it has accuracy beyond the bits that must be processed. By contrast, numerical computational fluid dynamics solutions to similar problems require processing of many more bits than are retained in the form of accuracy of the final solution.

The linearly-dependent relationship provides extremely high accuracy because it ensures that the mean dynamics of a system are unaffected by noise or fluctuation levels in the system, which, in turn, establishes that the system can achieve statistical accuracy. Unlike arithmetic accuracy, which is bounded by the number of bits employed in computations, statistical accuracy is bounded only by the statistical sample size from which the mean dynamics are determined.

DESCRIPTION OF THE PREFERRED EMBODIMENTS

Figure 1:
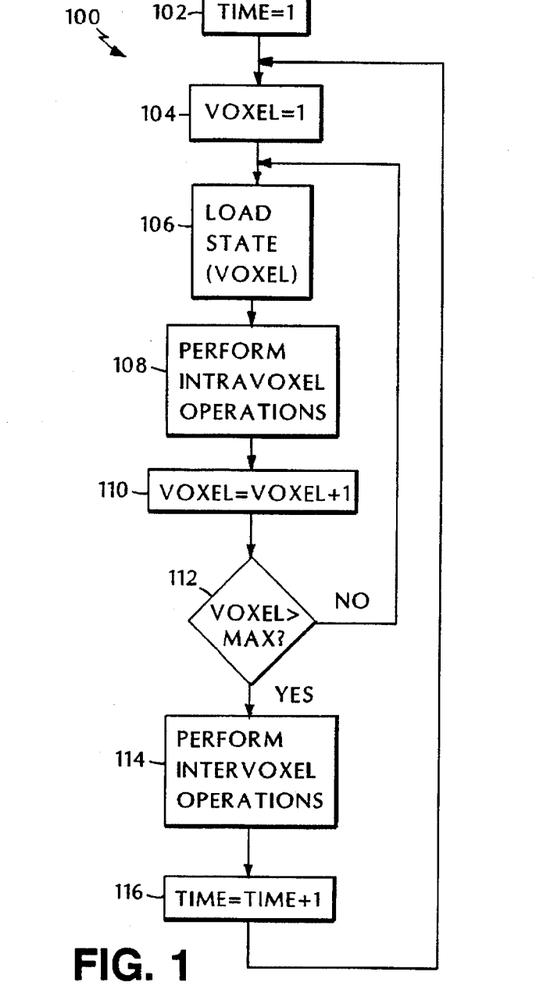
FIG. 1 is a flow chart of a procedure followed by a physical process simulation system.

Referring to FIG. 1, a physical process simulation system operates according to a procedure 100. At startup, a timer is initialized (step 102). Next, a voxel counter that points to a particular voxel (or location) within the lattice is initialized to point to the first voxel in the lattice (step 104).

After initialization, the system loads the state vector corresponding to the voxel designated by the voxel count (step 106). The state vector completely defines the status of the voxel, and includes 49 or more multi-bit entries, each of which corresponds to an integer value. The 49 entries correspond to a rest state, 24 directional vectors at a first energy level and 24 directional vectors at a second energy level. Though only 49 entries are required, preferred embodiments provide for six rest states and therefore use 54 entries. Six rest states are employed to ensure that there are a sufficient number of rest "slots". Of course, this same effect could be achieved by increasing the number of bits in the single entry corresponding to the rest state in a 49 entry embodiment. By using multi-bit entries, the system offers substantially improved performance over systems that used single-bit entries to define voxel status. In particular, unlike single-bit systems that could only produce Fermi-Dirac statistics, which are unsuitable for many applications, the system can produce Maxwell-Boltzmann statistics.

After loading the state vector, the system performs all intravoxel operations on the state vector (step 108). Intravoxel operations are those that do not require information about other voxels. For example, in a fluid simulation system, intravoxel operations would account for collisions between particles within a voxel.

Upon completing the intravoxel operations, the system increments the voxel counter (step 110). If the new voxel count does not indicate that the last voxel in the lattice has been processed (step 112), the system loads the state vector of the next voxel (step 106) and continues processing.

If the new voxel count indicates that the last voxel in the lattice has been processed (step 112), the system performs intervoxel operations (step 114). Intervoxel operations are those that require information from more than one voxel. For example, in a fluid simulation system, intervoxel operations would account for movement of particles between voxels. After performing intervoxel operations, the system increments the time (step 116), reinitializes the voxel counter to point to the first voxel (step 104), and continues processing.

Operation of a preferred embodiment of the system is described in detail below. For clarity, the system described above has been described as operating serially. However, as noted below, the system, like other lattice systems, is ideally suited for parallel operations. For example, intravoxel operations could be performed on multiple voxels simultaneously. Similarly, as long as intravoxel operations on all of the voxels involved in an intervoxel operation are complete, the intervoxel operation could be performed simultaneously with other intervoxel or intravoxel operations.

The disclosures of U.S. application Ser. No. 08/030,573, filed Mar. 12, 1993; PCT application Ser. No. PCT/US91/04930, filed Jul. 12, 1991; U.S. application Ser. No. 07/812,881, filed Dec. 20, 1991; and U.S. application Ser. No. 07/555,754, filed Jul. 12, 1990 are all hereby incorporated by reference.

Data Structure

Before any of the computational operations are described, it is necessary to briefly describe the elementary data structure that comprises the basic state vector for each voxel. This is the basic element upon which the majority of required computations operate. Each lattice site, or voxel (these two terms are used interchangeably throughout this document), contains 54 states for subsonic mono-species simulations. The number of states will be lengthened for transonic flows or multiple-species simulations.

In this document the state space is represented with the following notation:

$$N_i(X, t)$$

where $N_i$ represents the number of elements, or particles, in state i at a lattice site denoted by the three-dimensional vector X at a time t.

The number of states is determined by the number of possible velocity vectors within each energy level. The velocity vectors consist of integer linear speeds in four-dimensional space: x, y, z and w. The fourth dimension, w, is projected back onto three-dimensional space and thus does not indicate an actual velocity in the three-dimensional lattice. For subsonic flows, i ranges from 0 to 53.

Each state represents a different velocity vector at a specific energy level (i.e., energy level zero, one or two). The velocity of each state is indicated with its "speed" in each of the four dimensions as follows:

$$\underline{c}_i = (c_x, c_y, c_z, c_w)$$

The energy level zero state (or states) represents stopped particles that are not moving in any dimension, i.e. $\underline{c}_{stopped} = (0, 0, 0, 0)$. Energy level one states represent particles having a +/−1 speed in two of the four dimensions and a zero speed in the other two. Energy level two states represent particles having either a +/−1 speed in all four dimensions, or a +/−2 speed in one of the four dimensions and a zero speed in the other three.

Generating all of the possible permutations of the three energy levels gives a total of 49 possible states (one energy zero state, 24 energy one states, 24 energy two states). In addition, the subsonic flow state space maintains a total of six stopped states as opposed to one, giving a total state count of 54 instead of 49.

Figure 2:
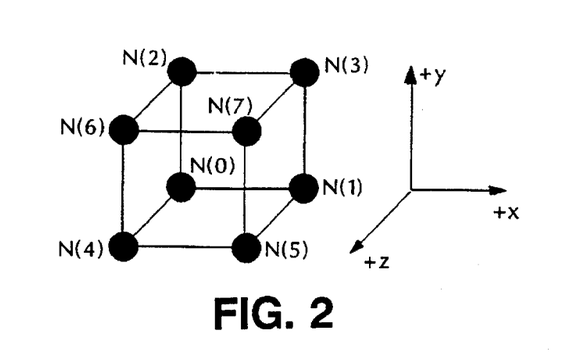
FIG. 2 is a perspective view of a microblock.

For processing efficiency, the voxels are grouped in 2×2×2 volumes that are called microblocks. The microblocks are organized to optimize parallel processing of the lattice sites as well as to minimize the overhead associated with the data structure. A short-hand notation for the lattice sites in the microblock is used throughout this document and is defined as $N_i(x)$, where x represents the relative position of the lattice site within the microblock and $x \in \{0,1,2, \ldots ,7\}$. A microblock is illustrated in FIG. 2.

Microdynamics (Intravoxel Operations)

The microdynamics operations simulate the set of physical interactions that occur within a voxel by sequentially applying a series of binary, trinary, or "n"ary interaction rules (also referred to as collision rules) to the state vector of a voxel during each time increment. For example, in the system described herein, there are 276 collision rules, each of which is implemented in a separate collision stage. Since the collision rules are applied sequentially, the result of their application has a complex nonlinear dependence on the initial state values that cannot be written simply in terms of those values. While the collision rules can be implemented as binary, trinary, or "n"ary collision events, for simplicity and ease of understanding the following discussion will refer primarily to binary collision events.

There are two basic types of collisions: non-energy exchanging "self" collisions and energy exchanging collisions. Self collisions allow for particles to collide with each other, thus changing their velocity. Because the state occupied by a particle determines the particle's velocity, a change in a particle's velocity is accomplished by moving that particle into a different state. A binary collision rule describes a self collision with reference to two input states and two output states, and simulates the collision of one or more particles from each of the input states by moving the particles to the output states. Because the collision rules are bi-directional, the input and output states are determined at the time the collision takes place depending on the states' populations. Essentially, the pair of states for which collisions are more likely are the input states, and act as the source of particles for the pair of states for which collisions are less likely (the output states).

Energy exchanging collisions differ from self collisions in that the two outgoing particles are at different energy levels than the two incoming particles. For subsonic flows there are only three energy levels: zero (stopped), one and two. To conserve energy, the only possible energy exchanging collisions occur when one pair includes two energy level one particles and the other pair includes an energy level two particle and a stopped particle. Energy exchanging collisions do not happen at the same rate in both directions. Rather, they happen at a forward rate from the energy level one states and a backward rate from the energy two and stopped states. As will be discussed in more detail below, these collision rates are dependent on the temperature of the system.

Each collision rule, whether directed to self or energy exchanging collisions, operates on a subset of the states of the state vector for a single voxel and simulates the net effect of collisions between particles in those states. For example, a binary collision rule operates on four states (i, j, k, l) and simulates the net effect of collisions between particles in the first two states (i, j) and collisions between particles in the second two states (k, l). Because a collision between a pair of particles in the first two states results in the velocities of those particles changing to the velocities corresponding to the second two states, and vice versa, a binary collision rule can be expressed as:

$$N_{scatt} = C(N_i(t), N_j(t), N_k(t), N_l(t))$$

$$N_i(t + \epsilon) = N_i(t) - N_{scatt}$$

$$N_j(t + \epsilon) = N_j(t) - N_{scatt}$$

$$N_k(t + \epsilon) = N_k(t) + N_{scatt}$$

$$N_l(t + \epsilon) = N_l(t) + N_{scatt}$$

where $\epsilon$ denotes the physically infinitesimal time required to perform the collision rule. Similarly, a trinary collision rule can be expressed as:

$$N_{scatt} = C(N_i(t), N_j(t), N_k(t), N_l(t), N_m(t), N_n(t))$$

$$N_i(t + \epsilon) = N_i(t) - N_{scatt}$$

$$N_j(t + \epsilon) = N_j(t) - N_{scatt}$$

$$N_k(t + \epsilon) = N_k(t) - N_{scatt}$$

$$N_l(t + \epsilon) = N_l(t) + N_{scatt}$$

-continued $$N_m(t + \epsilon) = N_m(t) + N_{scatt}$$

$$N_n(t + \epsilon) = N_n(t) + N_{scatt}.$$

It should be appreciated that the state change resulting from application of a collision rule actually reflect the net state change. For example, when application of a collision rule results in four particles from each of states i and j moving to each of states k and l, this movement might actually represent collisions that resulted in, for example, fifty six particles from each of states i and j moving to each of states k and l, and fifty two particles from each of states k and l moving to each of states i and j.

To accurately simulate physical systems, each collision rule must conserve mass, momentum and energy. Because the rules simply move particles from one state to another, and do not create or destroy particles, they necessarily conserve mass. To ensure that a rule conserves momentum, the states affected by the rule are selected so that:

$$C_i + C_j = C_k + C_l.$$

Similarly, to ensure that a rule conserves energy, the states affected by the rule are selected so that:

$$C_i^2 + C_j^2 = C_k^2 + C_l^2.$$

Thus, the states i, j, k, and l are selected for each rule so that a pair of particles from states i and j has the same total momentum and energy as a pair of particles from states k and l. Because the incoming and outgoing pairs of states must always conserve mass, momentum and energy, not all possible quartets within the 54 states correspond to a "legal" collision rule.

For a particular collision rule, $N_{scatt}$ is determined by applying a collision operator to the states affected by the rule. The arithmetic/computational form of the collision operator determines the practicality of implementing the operator in a simulation system. The statistical properties of the collision operator determine the extent to which accurate behavior can be achieved during a simulation.

The preferred collision operator is one for which $N_{scatt}$ approaches zero as the numbers of particles in the states affected by a rule approach their equilibrium values. For binary collisions, the preferred operator is the "multilinear rule", which has the following form:

$$N_{scatt} = A_\alpha [R_f * N_i * N_j - R_b * N_k * N_l]$$

where $A_\alpha$ is a collision coefficient and $R_f$ and $R_b$ are the forward and backward collision rates for energy exchanging collisions. The coefficient $A_\alpha$ depends only on local temperature and density. Since temperature and density do not change due to collisions, $A_\alpha$ is a constant in a particular time increment, and can be determined prior to all collisions.

The value of $A_\alpha$ varies for each type of collision (self collisions between particles at energy level one, self collisions between particles at energy level two, and energy exchanging collisions) as shown below. If $\alpha=1$, 2 or $\epsilon$ represents, respectively, self collisions at energy levels one or two, and energy exchanging collisions, then:

$$A_\alpha = \frac{1}{4 \langle N \rangle_\alpha^{eq}}, \alpha = 1, 2;$$

$$A_\alpha = \frac{1}{2R_f \langle N \rangle_1^{(eq)} + R_b (\langle N \rangle_0^{(eq)} + \langle N \rangle_2^{(eq)})}$$

where $$\langle B \rangle_\alpha^{(eq)} (\alpha = 0, 1, 2)$$

is the equilibrium state population at energy level $\alpha$:

$$\langle N \rangle_0^{(eq)} = \frac{\rho}{6} [1 - 3T(1 - T)]$$

$$\langle N \rangle_1^{(eq)} = \frac{\rho}{12} T(2 - 3T)$$

$$\langle N \rangle_2^{(eq)} = \frac{\rho}{24} T(3T - 1)$$

where $\rho$ and T are the local density and temperature, respectively.

For energy exchanging collisions, states i and j are the energy level one states and states k and l are the energy level two and rest states so that $R_f/R_b$ represents the rate of collisions between energy level one particles relative to the rate of collisions between energy level two and rest particles. $R_f/R_b$ is defined as:

$$\frac{R_f}{R_b} = \frac{6}{d_0} \frac{(3T-1)[1 - 3T(1-T)]}{T(2-3T)^2}$$

where $d_0$ is the number of stopped particle states and equals six in the described embodiment. Like $A_\alpha$, $R_f/R_b$ is constant in a particular time increment and can be determined prior to all collisions. The temperature of the fluid; however, is not necessarily constant over the length of a simulation, especially for simulations involving heat transfer, and $A_\alpha$ and $R_f/R_b$ will have to be updated dynamically during the simulation to reflect changes in the local temperature. The temperature range supported for subsonic flows is between ⅓ and ⅔. For self collisions, $R_f/R_b$ equals one.

As an example of a self collision, the following initial state is proposed:

$$c_i = (1, 0, 1, 0), N_i = 25,$$

$$c_j = (1, 0, -1, 0), N_j = 40,$$

$$c_k = (1, 0, 0, 1), N_k = 53, \text{ and}$$

$$c_l = (1, 0, 0, -1), N_l = 20.$$

As shown, i, j, k and l are selected so that states i and j and states k and l each have a total momentum of two in the x dimension and zero in the y, z and w dimensions, and so that each state is an energy level one state. Assuming that the average number of particles in the twenty four energy level one states is the average of $N_i$, $N_j$, $N_k$ and $N_l$ (34.5), then there are 828 (24*34.5) energy level one particles. Further assuming that T equals one half implies that there are 414 energy level two particles (828/2) and 414 energy level zero particles (828/2). Accordingly, $\rho$ equals 1656 (828+414+414), $\langle N \rangle_1^{(eq)}$ equals 34.5, $A_1$ equals 1/138, and $N_{scatt}$ equals −0.43478 ((25*40-53*20)/138). After application of the collision rule, the state populations have the following values:

$$N_i = 25 - (-0.43478) = 25.43478,$$

-continued $$N_j = 40 - (-0.43478) = 40.43478,$$

$$N_k = 53 + (-0.43478) = 52.56522, \text{ and}$$

$$N_l = 20 + (-0.43478) = 19.56522.$$

These new values of $N_i$, $N_j$, $N_k$ and $N_l$ drive the equilibrium measure to zero:

$$(N_i * N_j - N_k * N_l) = (25.43478 * 40.43478) -$$

$$(52.56522 * 19.56522) = 1028.45 - 1028.45 = 0$$

A potential for overflow or underflow of a state's particle count exists in the collision operation described above. An overflow would result in a loss of mass, momentum and energy and would occur if the sum of the state population and $N_{scatt}$ exceeded 255. By contrast, an underflow would result in creation of mass, momentum and energy and would occur if the result of subtracting $N_{scatt}$ from the state population was less than zero. Because the conservation of mass, momentum and energy is paramount in the simulation environment, an exchange of particles is prevented if it would cause either an overflow or underflow in any of the states involved in the collision.

Due to hardware limitations, $N^{scatt}$ is maintained as an integer value. For non-energy exchanging collisions, $N^{scatt}$ is determined as:

$$N_{scatt} = \text{floor}[\underline{A}_\alpha * (N_i * N_j - N_k * N_l) + \text{rand}]/\text{scale}]$$

where $\underline{A}_\alpha$ is $A_\alpha$ scaled by multiplication by a constant, scale, that has a value of $2^{16}$. The random number rand takes on values between zero and one prior to scaling, and is then scaled up by scale to values between 0 and $2^{16}-1$. Because the values are scaled up by scale, the division by scale is merely a matter of shifting the result of the multiplication and addition operations. The operator floor then produces an integer value from this shifted result. In particular, floor returns the largest integer that is less than or equal to its argument. For example, floor(2.3) equals 2 and floor(-2.3) equals -3. For energy exchanging collisions, $N^{scatt}$ is determined as:

$$N_{scatt} = \text{floor}[(R_f' * N_i * N_j - R_b' * N_k * N_l) + \text{rand}]/\text{scale}]$$

where $R_f'$ and $R_b'$ are, respectively, $R_f$ and $R_b$ multiplied by $\underline{A}_\alpha$. Rand is employed to prevent the truncation that results from the floor operation from introducing statistical bias into the system. Use of rand ensures that this operation, which forces $N_{scatt}$ to take on integer values, will not statistically bias $N_{scatt}$ in a particular direction.

With this approach, the values of $N_i$, $N_j$, $N_k$ and $N_l$ for the example provided above would be set to (25, 40, 53, 20) with 56,522% probability and (26, 41, 52, 19) with 43.478% probability. Averaged over a large number of trials, the mean values for $N_i$, $N_j$, $N_k$ and $N_l$ would be (25.43478, 40.43478, 52.56522, 19.56522). Thus, though a single application of the rule does not necessarily drive the populations toward equilibrium, the statistical mean values of the populations over a large number of applications of the rule correspond to the equilibrium values for those populations.

Advection (Intervoxel Operations)

In addition to the particle microdynamics, the particles must also move (advect) along the three-dimensional rectilinear lattice. Each of the separate states represents particles moving along the lattice with integer speeds in each of the three dimensions: x, y, and z. The integer speeds include: 0, +/-1, and +/-2. The sign of the speed indicates the direction in which the particle is moving along that axis. These linear speeds will support particles with energy levels ranging from zero to four. Only energy levels zero to two are needed for subsonic flow simulations, while all five are needed for transonic flow simulations.

The move operations are computationally quite simple. The entire population of a state is moved from its current voxel to its destination voxel during every time increment. At the same time, the particles at the destination voxel are moved from their present voxel to their own destination voxels. For example, an energy level 1 particle that is moving in the +1x and +1y direction (1,1,0,0) must be moved from its current voxel to one that is +1 over in the x direction and +1 up in the y direction. The particle ends up at its destination voxel with the same state it had before the move (1,1,0,0). The next phase of microdynamics will likely change the particle count for that state based on local interactions with other particles and surfaces. If not, the particle will continue to move along the lattice at the same speed and direction.

All of the move operations that will place particles into a given voxel must occur before that voxel is collided again. Since all of the microdynamics operations are performed local to one voxel, only the moves relative to a particular voxel must be completed before the microdynamics operations can begin for that voxel for the next time increment.

It should be noted here that particles in the stopped states (energy level zero) do not get moved. In addition, the particles only get moved in three dimensions. Non-zero values in the w dimension of a state do not affect the determination of lattice site to which the state's particles are to be moved. For example, an energy level one particle with a -1z and a +1w state vector (0,0,-1,1) must be moved as a particle with the same state vector (0,0,-1,1) to a site -1 in the z dimension. There are also two energy level two states that do not get moved at all: (0,0,0,2) and (0,0,0,-2).

Collision Operators—Performance Considerations

Another collision operator, referred to as the "divide rule", has also been proposed. The divide rule determines $N_{scatt}$ as:

$$N_{scatt} = \left[ \frac{R_f * N_i * N_j - R_b * N_k * N_l}{R_f(N_i + N_j) + R_b(N_k + N_l)} + \text{rand} \right]$$

The divide rule is implemented in software by first calculating $R_f$, $R_b$, the numerator and the denominator in floating point numbers and performing the division. Thereafter, a random value between 0 and 1 is added to the result of the division. Finally, $N_{scatt}$ is produced by converting the result of the addition to an eight-bit integer value using the floor operation described above. Due to the division required, this calculation is more difficult to implement in hardware.

By contrast to the multilinear rule and the divide rule, the sandpaper rule of the Chen et al. system determines $N_{scatt}$ as:

$$N_{scatt} = G * \text{sign}(R_f * N_i * N_j - R_b * N_k * N_l)$$

where G, the "grit", is an externally provided parameter that, when there are 276 rules, typically equals eight for the first 69 rules, four for the second 69 rules, two for the third 69 rules, and one for the last 69 rules. In the sandpaper rule, sign is a function that returns a positive one if the value enclosed in the brackets is greater than or equal to zero, and otherwise returns a negative one.

A primary requirement in selecting a collision operator is that the operator be able to drive a simulated system to Boltzmann equilibrium. For a collision operator to do so, repeated application of the collision rules must drive the system to some equilibrium value where, for a given set of macroscopic conditions, the individual state populations, $N_i$, take on known values as determined by the Boltzmann distribution:

$$N_i = r_i \exp(\alpha m + \gamma m c_i + \beta \tfrac{1}{2} m c_i^2)$$

where the factors in the exponent represent the conserved invariants of mass (m), momentum ($mc_i$) and energy ($mc_i^2$), it is assumed that no additional ("spurious") invariants occur, and $r_i$ represents a weighting factor generated from $R_f$ and $R_b$. Attainment of this distribution after each application of the collision rules will result in hydrodynamic behavior to some accuracy.

A simple way to derive this equilibrium is to assume that all collisions have occurred and have driven the interacting states to their individual equilibria. Thus, for a binary collision rule, the equilibrium is:

$$R_f * N_i * N_j = R_b * N_k * N_l$$

and, for the multilinear and division rules, $N_{scatt}$ equals zero. Taking logarithms of both sides in the preceding equation implies: where $$\ln r_i^{-1} N_i + \ln r_j^{-1} N_j = \ln r_k^{-1} N_k + \ln r_l^{-1} N_l$$

$$r_i^{-1} r_j^{-1} = R_f$$

and $$r_k^{-1} r_l^{-1} = R_b.$$

This equation now must be satisfied for all pairs of pairs, (or pairs of trios, etc.) that are allowed under the collision rules. To satisfy the equation, $\ln N_i$ must be a sum of summational invariants of the collision process (i.e. quantities whose sum over particles are conserved) in the following form:

$$\ln r_i^{-1} N_i = \sum_\alpha A_\alpha I_i^\alpha$$

where $I_i^\alpha$ is the $\alpha$th invariant associated with state i, (e.g., a component of the momentum, $m_i c_i$, in the equation for $N_i$ above), and $A_\alpha$ are the coefficients associated with their corresponding invariants (e.g., $\alpha$, $\beta$ and $\gamma$ in the equation for $N_i$ above). As long as the mass, momentum and energy are the only conserved quantities (i.e., there are no spurious invariants), then the Boltzmann distribution results from this equation.

Each of the collision operators described above (i.e., multilinear rule, divide rule, and sandpaper rule) achieves a Boltzmann equilibrium to some approximation, and each has performed well in simulation applications. (Though the sandpaper rule, by definition, is unable to produce an $N_{scatt}$ equal to zero, it still produces a worthwhile approximation of the Boltzmann equilibrium.) However, the statistical properties of the operators are quite different and these differences have significant consequences for the overall accuracy of the statistically averaged mean dynamics of the system.

There is a difference between the instantaneous accuracy of the state and the accuracy of the statistical mean behavior in replicating the true continuum dynamics of a fluid. The instantaneous accuracy is arithmetic, and is measured by the number of bits used to represent each state. By contrast, the mean accuracy is measured by the ability of the system to replicate the dynamics of a true continuum fluid as measured by the hydrodynamic quantities. For example, the maximum accuracy that can be achieved with an eight-bit representation of $N_i$ is 1/255 or about a half percent. On the other hand, by accumulating statistics from averaging over some portion of space and time, the average value, $<N_i>$ can be accumulated to an accuracy of:

$$1/(255 * \sqrt{\text{number of samples}}\,)$$

and is therefore limited only by the number of samples from which the statistics are accumulated. Thus, the key theoretical challenge in producing a simulation system is to establish accurate statistical mean behavior, and the accuracy of the instantaneous state representations is largely irrelevant. The key difference among the above collision operators is that they give qualitatively different statistical accuracies.

Because the multilinear rule and, to some extent, the divide rule, produce accurate statistical mean behavior, they provide superior performance over the sandpaper rule of the Chen et al. system under many conditions. These operators produce accurate statistical behavior because they produce an $N_{scatt}$ that approaches zero as the system approaches an equilibrium condition, and are therefore able to more closely achieve the Boltzmann distribution. Moreover, the multilinear rule achieves improved performance over the division rule under many conditions because, for each collision rule, the multilinear rule produces an $N_{scatt}$ that is linearly related to the states affected by the rule, while the division rule produces an $N_{scatt}$ that is not linearly related.

Viewed another way, the multilinear rule achieves improved performance over the other operators because it produces results that are more statistically accurate than those produced by the other operators. The multilinear rule produces statistically accurate results because, due to the operator's linear relationship with the state values, the mean system dynamics that the multilinear rule produces are unaffected by the noise or fluctuation level of the system.

Any instantaneous (unaveraged) physical variable $Q_i$ (i=1, ..., m) in a system with m-degrees of freedom may be written in two parts:

$$Q_i = <Q_i> + \delta Q_i,$$

where $<Q_i>$ is the mean value (by some proper averaging) and $\delta Q_i$ is the fluctuating part due to truncation or other errors. The dynamics of such a system can generally be described as:

$$Q_i(t+\delta t) = C_i(\{Q_j(t); j=1, \ldots, m\}); i=1, \ldots, m.$$

For the mean dynamics to be unaffected by noise, it must be possible to express the mean value of $Q_i(t+\delta t)$ as a function of the mean values of the state for the previous time increment:

$$<Q_i(t+\delta t)> = C_i(\{<Q_j(t)>; j=1, \ldots, m\}).$$

However, this may occur only if:

$$<C_i(\{Q_j(t); j=1, \ldots, m\})> = C_i(\{<Q_j(t)>; j=1, \ldots, m\}).$$

Because $$<\delta Q_i> = 0 \text{ and } <\delta Q_i^\alpha> \neq 0 \text{ for } \alpha \neq 1,$$

$C_i(\{Q_j(t); j=1, \ldots, m\})$ will satisfy this condition if it has a linear form (i.e., one in which there are no self-correlation terms (e.g., $Q_j(t)^n$ with $n \neq 1$)).

Of the three collision operators discussed herein, only the multilinear rule has the linear form required for statistical accuracy, And this collision operator is therefore preferred over the division and sandpaper rules.

Hardware

Figure 3:
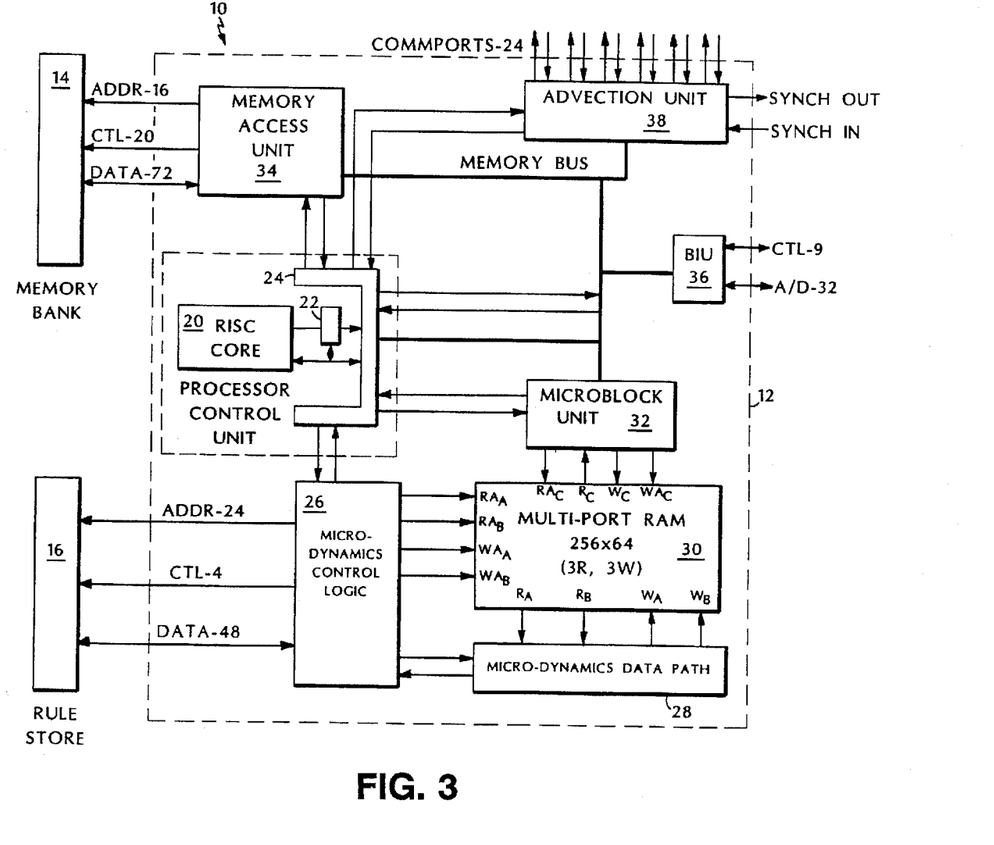
FIG. 3 is a block diagram of a functional unit of a physical process simulation system.

Referring to FIG. 3, the system described above can be implemented using a functional unit 10 that includes an application specific integrated circuit ("ASIC") 12 coupled to a memory bank 14 and a rule store 16. Though a system can be implemented using a single functional unit 10, ASIC 12 is designed so that hundreds, or even thousands, of functional units 10 can be connected together and operated in parallel for improved performance.

ASIC 12 includes a processor control unit ("PCU") 18 that itself includes a reduced instruction set computer ("RISC") processor 20, an instruction cache 22, and RISC interface logic 24. Processor control unit 18 acts as a central controller and issues vector-like commands to the various functional units. The functional units act as co-processors, taking an instruction from the processor control unit 18 and executing their own set of predefined sequences of instructions to complete the task. The instructions for processor control unit 18 are downloaded into memory bank 14 and are executed from there by processor control unit 18. These instructions control processor control unit 18 and cause it to issue commands to the other functional units in ASIC 12.

In addition to storing instructions for PCU 18, memory bank 14 stores particle states for each voxel assigned to the ASIC 12 along with the associated data structure and overhead information. The amount of storage provided by memory bank 14 dictates the amount of resolution that ASIC 12 can be assigned as its part of the total simulation volume. Memory bank 14 is constructed from a set of standard commodity synchronous DRAMs, which have been selected over standard asynchronous DRAMS due to their pipelined access mode and high data bandwidth capabilities.

A microdynamics unit ("MDU"), which includes microdynamics control logic 26 and a microdynamics data path 28, is the functional unit that is responsible for processing the particle dynamics. This includes particle interactions with each other as well as with surfaces. Microdynamics data path 28 includes the hardware necessary to perform the computations on the voxel data. Microdynamics control logic 26 sets up the data path to perform the correct operation and selects the proper data to be processed. Microdynamics control logic 26 sets up the data path and selects the data based on rule sets retrieved from rule store 16. Rule store 16 is constructed out of SRAMs to provide a fast access time and the ability to load the memory as the microdynamics rules are changed.

A multi-port RAM 30 acts as a register file for the particle states and the associated data that the microdynamics data path 28 is currently processing. RAM 30, which is a six-port static RAM, has 256 64-bit entries and supplies two read ports and two write ports to microdynamics data path 28. In addition, RAM 30 provides a read port and a write port to a microblock unit 32. This third set of ports is used for concurrent data movement between RAM 30 and a memory access unit 34 as well as for statistics. Memory access unit 34 is the central source and destination of particle data transfers within ASIC 12, and controls memory bank 14.

Figure 4:
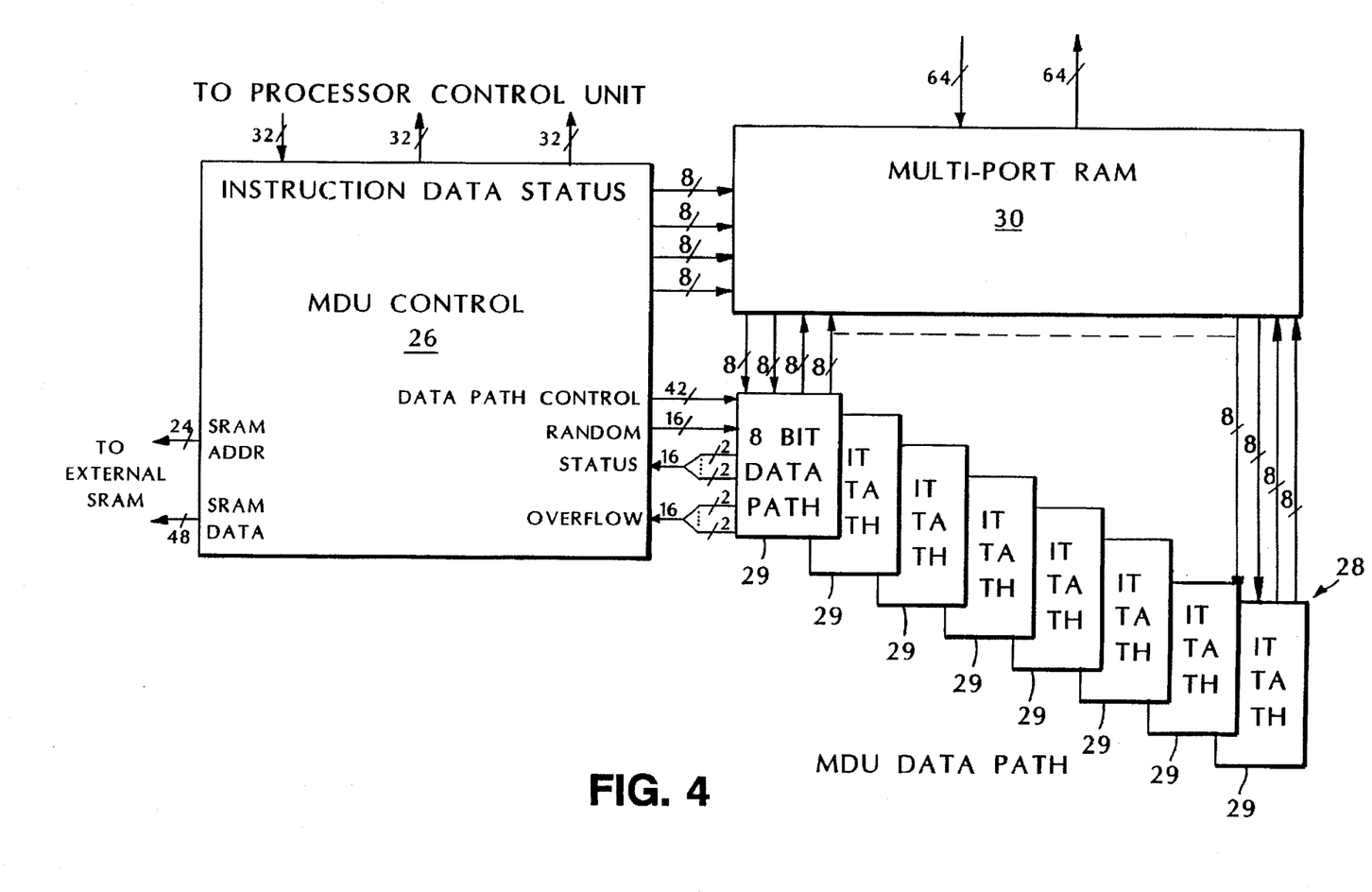
FIG. 4 is a block diagram of a microdynamics unit of the system of FIG. 3.
Figure 5:
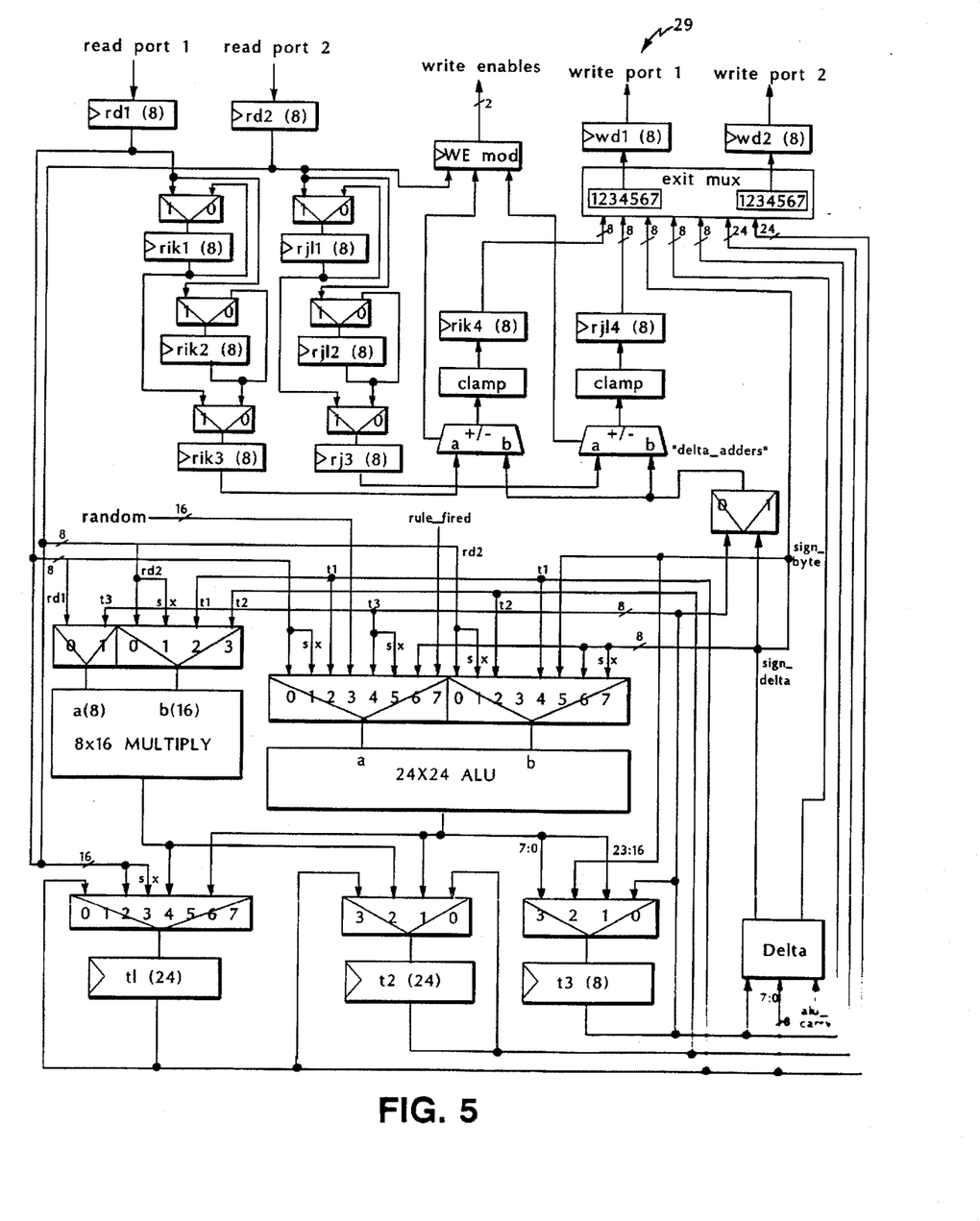
FIG. 5 is a block diagram of a single-voxel data path of the microdynamics unit of FIG. 4.

Referring also to FIGS. 4 and 5, microdynamics data path 28 processes eight voxels in parallel, by providing eight identical copies of the eight-bit data path 29 necessary to process one voxel. Microdynamics control logic 26 is constructed as a SIMD (single instruction multiple data) controller, where all eight sites are set up to execute the same operation on their independent voxel data.

A bus interface unit ("BIU") 36 connects ASIC 12 to external processors such as, for example, a general purpose "host" processor used for system control. The main functions of BIU 36 are to provide a path for the system's host processor to provide initialization information to ASIC 12, and to send statistical information from ASIC 12 to the host processor. In addition, BIU 36 provides a path to memory access unit 34 so that memory bank 14 is accessible to the host processor.

An advection unit ("AU") 38 provides the data path and control to enables particles to advect (move) along the cubic lattice, including support for those particles that are moving to a destination voxel that is owned by another ASIC 12. To transmit particles to a voxel owned by another ASIC 12, AU 38 includes communications ports.

Microblock unit 32 is responsible for calculating statistics on the data being processed in the MDU. After the voxel data has been processed in the MDU, microblock unit 32 uses the voxel data to generate the statistics. The data is then sent back to memory bank 14 through memory access unit 34.

The RISC processor 20 is capable of doing the standard set of 32-bit integer arithmetic and logical operations. In effect, the RISC processor can be coded to execute a program in memory as any standard processor could.

A memory map has been established for ASIC 12 that essentially creates three segments in the processors 4 GB address space:

1) 2 GB (minus 8 MB) of direct access to the external memory bank controlled by the MAU.
2) 8 MB of on-ASIC memory mapped registers and instructions owned and decoded by the functional units.
3) 2 GB of off-chip host memory access connected through the BIU.

The logic in the PCU decodes the address issued by the RISC processor and determines where it should be sent. Local memory requests are sent to the MAU. Memory mapped register reads or writes which includes functional unit instructions are sent to the appropriate functional unit. Host memory references are sent to the BIU which will forward the requests to the host system.

There are four functional units that are capable of requesting memory transfers from the MAU: the processor control unit, the bus interface unit, the microblock unit, and the advection unit. The MAU arbitrates between the requests from these four units and allows single and multiple word transfers. The MAU maintains a DMA engine to support the burst transfers. Upon receiving a grant from the MAU, the unit connects to the MAU and drives or receives data until its transfer is complete.

The RISC processor initiates the transfer of most of the data packets between the various functional units and the MAU. The function units, or co-processors in this model, have no knowledge of system or ASIC level transactions. The units are given data and tasks to perform by the RISC engine and they process that data locally. For example, the processor instructs the microblock unit to fetch a specific block of data from the memory controlled by the MAU and place it into the multi-port RAM. The RISC engine then issues an instruction to the microdynamics unit to process that data. After the processing is complete, the RISC engine instructs the microblock unit to retrieve the block of data from the multi-prot RAM and put it back in a specific location in memory.

In addition to the PCU initiated memory requests, there are 2 off-chip sources of MAU memory transfers: memory requests initiated by the host system via the BIU, and data received from other processors via the AU's communications ports.

The co-processor units are capable of processing routines that take from tens to hundreds to even thousands of cycles based on a single command from the RISC engine and a block of data held in local storage. This processing length allows the RISC engine enough free time to issue commands and check the status of the other units in addition to possibly doing some calculations itself to update the data structure or determine the segment to process next.

The RISC processor issues instructions to the functional units via memory mapped writes. The address of the write specifies the functional unit along with the opcode of the instruction for that functional unit. The 32-bits of data provided by the write are parameters of the opcode. Each opcode specifies how it interprets the data bus. Each functional unit can only handle one instruction at a time. If a unit is busy processing an instruction previously issued, any new instructions will be pended at the PCU. The RISC processor is also free to read registers and status in each of the functional units to determine the current state of the machine.

To off-load the RISC processor from complicated control loops required to issue memory mapped instructions, an instruction queue is provided in the PCU to queue up a number of instructions. The instruction at the head of the queue is dispatched to the appropriate functional unit as soon as that unit is free to take a new instruction. If the unit is busy, then the queue will not issue the instruction and will stall all subsequent instructions. This queuing mechanism allows the dependencies between the function units to be encoded in the ordering of the queued instructions. At any time, the processor is free to by-pass the instruction queue and issue instructions directly to and read information from the function units.

In operation, an inner loop is set up to perform one time-step update on an eight voxel fluid microblock. A time-step update consists of all of the computations necessary to collide, move, and collect statistics for the eight voxels in a microblock. Subsonic dry air simulations require that the list of 276 collision rules be applied to all of the voxels and that all of the particles be moved to their proper destination sites.

The collision process requires that all 54 states for the microblock be loaded into the Multi-Port RAM before they are processed with the collision rules supplied by the rule store. The advection process requires that all of the states get moved in each of the 6 directions (+x, −x, +y, −y, +z, −z). However, moving a microblock in all six directions and then processing the next microblock is very inefficient, since it requires that all of the particles moving out of the microblock be temporarily stored until the data can be loaded into their destination microblocks. A more efficient way of processing advection is to process only particles moving in one of the six directions at a time on a large number of microblocks before moving particles in another direction on the same group of microblocks, and this is the approach that is taken.

Other embodiments are within the following claims.

What is claimed is:

1. A computer implemented method for simulating a physical process, comprising the steps of:
   (1) storing in a memory a state vector for each of a plurality of voxels,
      each state vector comprising a plurality of integers,
      each integer of the vector corresponding to a particular momentum state of a plurality of possible momentum states at a voxel,
      each integer representing the number of elements having the particular momentum state, and
      each integer having more than two possible values;
   (2) performing interaction operations on the state vectors, the interaction operations modelling interactions between elements of different momentum states and including a collision operator that comprises collision rules that each operate on a subset of the integers of a state vector to transfer between integers representing a first set of momentum states within the subset and integers representing a second set of momentum states within the subset a number of elements that is determined based on the number of elements in the first and second sets of momentum states;
   (3) performing move operations on the state vectors that reflect movement of elements to new voxels.

2. A computer system for simulating a physical process, comprising:
   (1) means for storing in a memory a state vector for each of a plurality of voxels,
      each state vector comprising a plurality of integers,
      each integer of the vector corresponding to a particular momentum state of a plurality of possible momentum states at a voxel,
      each integer representing the number of elements having the particular momentum state, and
      each integer having more than two possible values;
   (2) means for performing interaction operations on the state vectors, the interaction operations modelling interactions between elements of different momentum states and including a collision operator that comprises collision rules that each operate on a subset of the integers of a state vector to transfer between integers representing a first set of momentum states within the subset and integers representing a second set of momentum states within the subset a number of elements that is determined based on the number of elements in the first and second sets of momentum states;
   (3) means for performing move operations on the state vectors that reflect movement of elements to new voxels.

3. The subject matter of claim 1 or 2 wherein the number of elements transferred by a collision rule is linearly related to the number of elements in each of the momentum states comprising the first and second sets of momentum states.

4. The subject matter of claim 3 wherein the number of elements transferred by a collision rule is related to the difference between the product of the number of elements in each state of the first set of momentum states and the product of the number of elements in each state of the second set of momentum states.

5. The subject matter of claim 4, wherein the first and second sets of momentum states each include only a pair of momentum states.

6. The subject matter of claim 3, wherein the first and second sets of momentum states each include only a pair of momentum states.

7. The subject matter of claim 3 wherein the number of elements transferred by a collision rule decreases as the simulated physical process approaches an equilibrium condition.

8. The subject matter of claim 7 wherein the number of elements transferred by a collision rule approaches zero as the simulated physical process approaches the equilibrium condition.

9. The subject matter of claim 8 wherein the number of elements transferred by a collision rule equals zero when the simulated physical process reaches the equilibrium condition.

10. The subject matter of claim 3 wherein the number of elements transferred by a collision rule equals zero when the simulated physical process reaches an equilibrium condition.

11. The subject matter of claim 1 or 2 wherein the number of elements transferred by a collision rule is related to the difference between the product of the number of elements in each state of the first set of momentum states and the product of the number of elements in each state of the second set of momentum states divided by the sum of the number of elements in each of the first and second sets of momentum states.

12. The subject matter of claim 11 wherein the number of elements transferred by a collision rule is determined as a real number and converted to an integer without producing statistical bias.

13. The subject matter of claim 1 or 2 wherein the number of elements transferred by a collision rule decreases as the simulated physical process approaches an equilibrium condition.

14. The subject matter of claim 13 wherein the number of elements transferred by a collision rule approaches zero as the simulated physical process approaches the equilibrium condition.

15. The subject matter of claim 14 wherein the number of elements transferred by a collision rule equals zero when the simulated physical process reaches the equilibrium condition.

16. The subject matter of claim 13 wherein the number of elements transferred by a collision rule equals zero when the simulated physical process reaches the equilibrium condition.

17. The subject matter of claim 1 or 2 wherein the first and second sets of momentum states are related so that a collision rule can conserve a combined value of one or more physical invariants that is represented by the subset of integers when transferring elements between the first and second sets of momentum states.

18. The subject matter of claim 17 wherein the conserved physical invariants comprise mass, momentum and energy.

19. The subject matter of claim 17, wherein a collision rule transfers elements from the first set of momentum states to the second set of momentum states when an equilibrium measure indicates an excess of elements in the first set relative to a number of elements in the second set necessary to achieve a equilibrium condition.

20. The subject matter of claim 1 or 2 wherein the collision rules are successively applied to different subsets of the integers of the state vector so that the first and second sets of momentum states differ for each collision rule.

* * * * *

UNITED STATES PATENT AND TRADEMARK OFFICE
CERTIFICATE OF CORRECTION

PATENT NO.  : 5,640,335          Page 1 of 2

DATED       : June 17, 1997

INVENTOR(S) : Kim Molvig, Christopher M. Teixeira, and Kenneth R. Traub

It is certified that error appears in the above-identified patent and that said Letters Patent is hereby corrected as shown below:

On the title page item,

[73] Assignee, "EXA Corporation" should be --Exa Corporation--.

[56] References Cited, OTHER PUBLICATIONS, page 2, column 1, the "Perez et al." reference, "OUIPPI-1" should be --OUPPI-1--.

[56] References Cited, OTHER PUBLICATIONS, page 2, column 1, after the "Molvig et al." reference, insert the following:
--Molvig et al., "Removing the Discreteness Artifacts in 3D Lattice-Gas Fluids," Proceedings of the Workshop on Discrete Kinetic Theory, Lattice Gas Dynamics and Foundations of Hydrodynamics (1989)--.

Column 6, line 14, "hi-directional" should be --bi-directional--.

Column 8, equation at line 1, "$A_\alpha$" should be --$A_\epsilon$--.

Column 8, equation at line 6, "$<B>$" should be --$<N>$--.

UNITED STATES PATENT AND TRADEMARK OFFICE
CERTIFICATE OF CORRECTION

PATENT NO. : 5,640,335

DATED : June 17, 1997

INVENTOR(S) : Kim Molvig, Christopher M. Teixeira, and Kenneth R. Traub

It is certified that error appears in the above-identified patent and that said Letters Patent is hereby corrected as shown below:

Column 9, line 53, "56,522" should be --56.522--.

Column 12, equation at line 40, after the second occurrence of "Q" insert --$_i$--.

Column 18, line 20, "a" should be --an--.

Signed and Sealed this

Third Day of March, 1998

Attest:

BRUCE LEHMAN

Attesting Officer

Commissioner of Patents and Trademarks